United States Patent [19]
Baker

[11] 3,858,607
[45] Jan. 7, 1975

[54] THREE-WAY, TWO-POSITION DIVERTER VALVE

[75] Inventor: William J. Baker, Orange, Calif.

[73] Assignee: Armco Steel Corporation, Middletown, Ohio

[22] Filed: June 1, 1973

[21] Appl. No.: 366,125

[52] U.S. Cl. ............................. 137/625.5, 251/282
[51] Int. Cl. ..................... F16k 11/00, F16k 31/30
[58] Field of Search....... 137/625.48, 625.47, 625.5, 137/625.26, 625.66, 556; 251/282, 333, DIG. 1, 63.6

[56] References Cited
UNITED STATES PATENTS

| | | | |
|---|---|---|---|
| 2,682,386 | 6/1954 | Lindsay...................... | 137/625.5 X |
| 2,897,836 | 8/1959 | Peters et al.................. | 137/625.5 X |
| 2,904,068 | 9/1959 | St. Clair.............................. | 251/367 |
| 2,969,218 | 1/1961 | Shaw.............................. | 251/357 X |
| 2,980,139 | 4/1961 | Lynn.............................. | 137/625.5 |
| 3,038,499 | 6/1962 | Dumm.......................... | 137/625.5 |
| 3,126,915 | 3/1964 | Hunt.............................. | 137/625.5 |
| 3,272,218 | 9/1966 | Johnson........................ | 251/359 X |
| 3,331,583 | 7/1967 | Baker............................ | 251/282 X |
| 3,415,282 | 12/1968 | Zoludow........................ | 137/625.48 |
| 3,701,599 | 10/1972 | Stewart.......................... | 137/625.48 |

Primary Examiner—Henry T. Klinksiek
Attorney, Agent, or Firm—Melville, Strasser, Foster & Hoffman

[57] ABSTRACT

A three-way, two-position diverter valve used to direct inlet flow through one of two outlets, as desired, in which the valve member is substantially balanced to permit high differential pressure thereacross with only a small force required to hold the valve member in sealing contact. A balance rod is connected to the valve member with the free end thereof projecting from the valve member into a pressure chamber. Means communicate with a passage through the valve member and with the area above the balance rod in the pressure chamber, alternately connecting the pressure chamber with the inlet passage and with one of the outlet flow passages. The area of the free end of the balance rod is substantially equal to the area of the valve seat so that the valve member and the balance rod create opposing forces.

15 Claims, 5 Drawing Figures

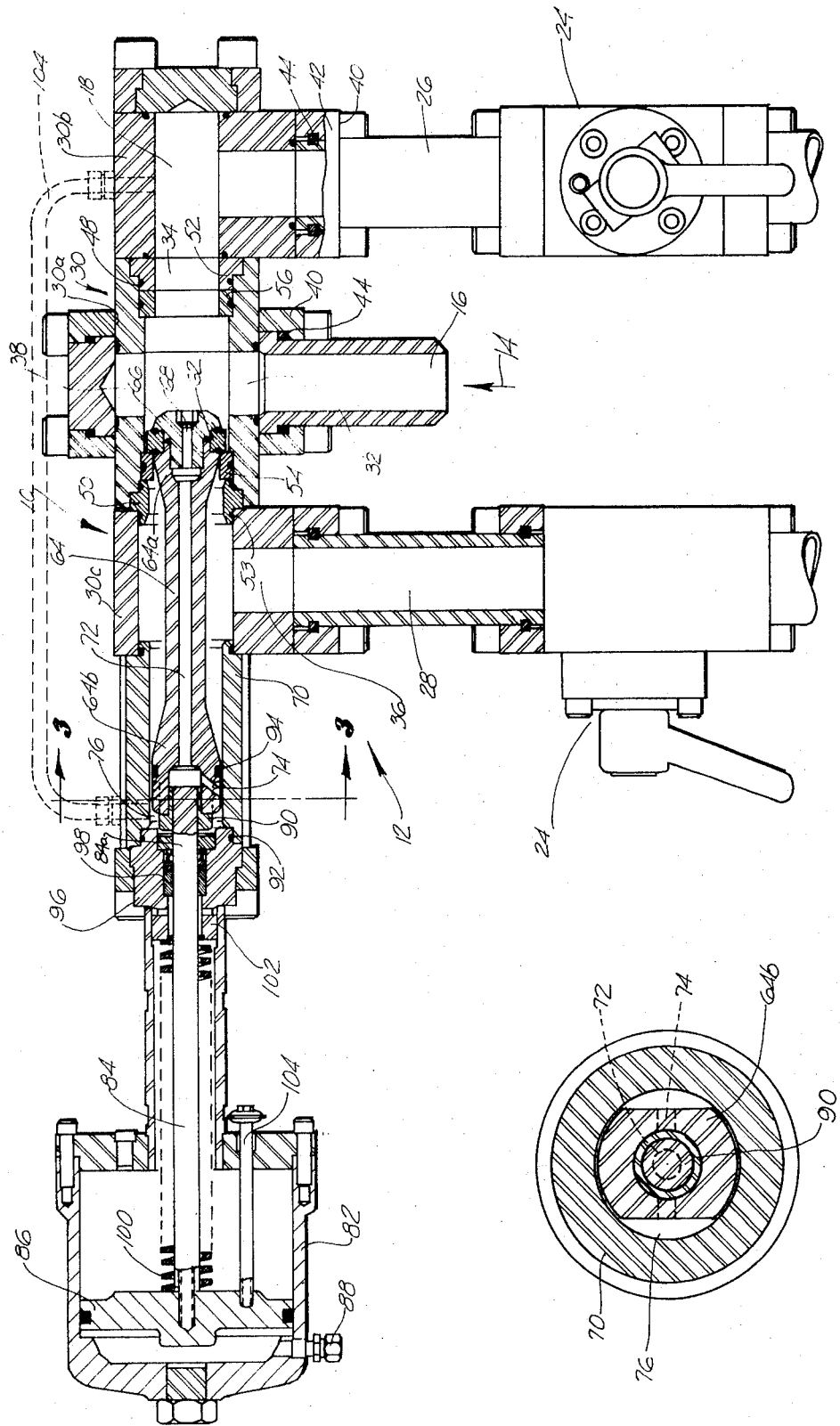

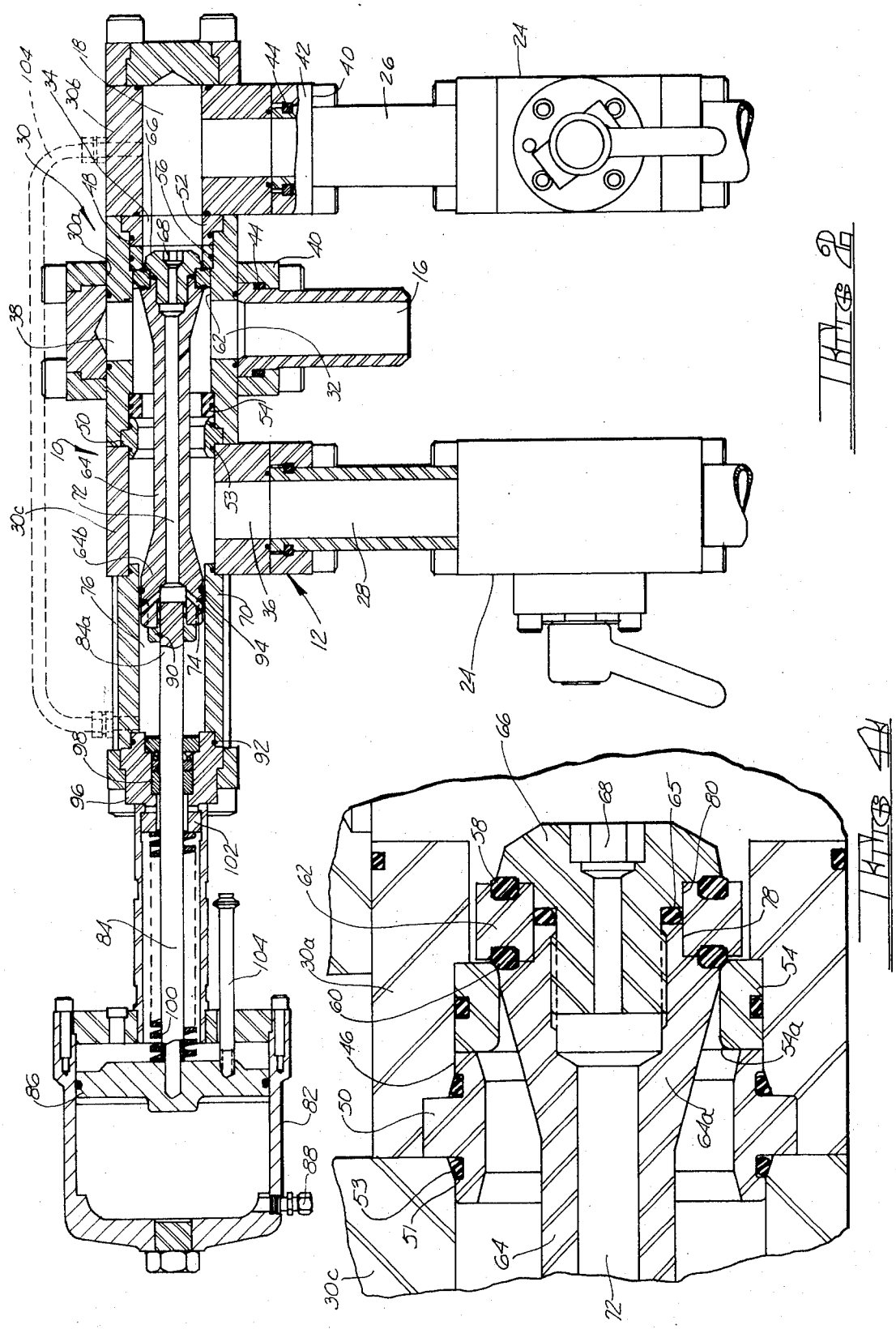

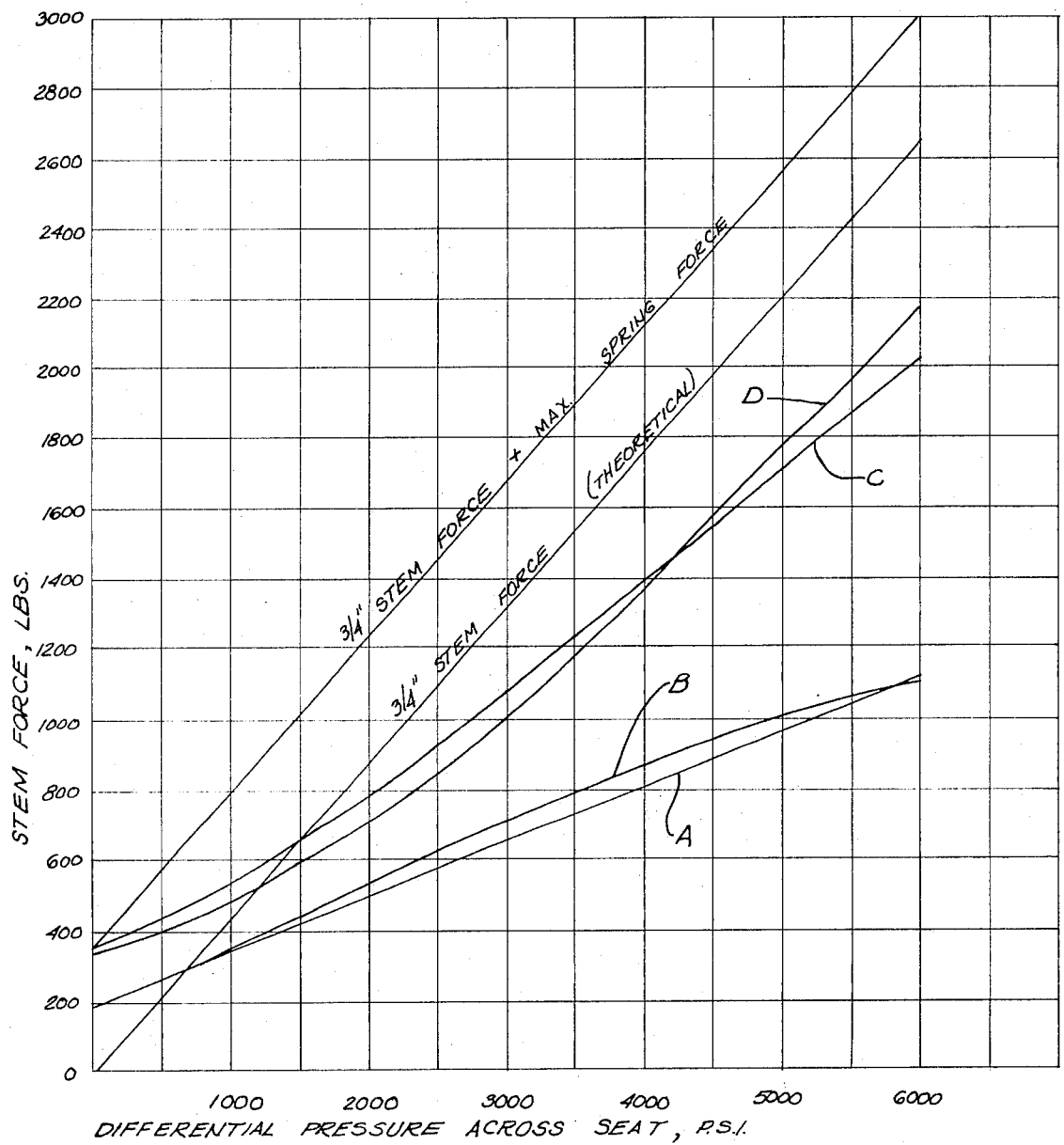

THREE-WAY, TWO-POSITION DIVERTER VALVE

BACKGROUND OF THE INVENTION

1. Field of the Invention:

The present invention relates to valves and more particularly to three-way, two-position diverter valves used to direct inlet flow through one of two outlets, as desired, for example, under manual control or automatically.

2. Description of the Prior Art:

Three-way, two position diverter valves have long been used to control the flow of high pressure fluids, as for example high pressure well production fluids in a well test manifold to direct the production flow stream from one path, for example, comingled production in group facilities, to an alternate path, for example, a test facility for a group of wells.

In the use of such three-way, two position diverter valves it has been the practice to provide a movable valve member which is adapted to shut off the flow to one or the other of the outlet flow passages upon contact with a valve seat. Where the line pressures involved are high, it is known to employ a hydraulically unbalanced valve head whereby the high line pressure is availed of as a means of supplying actuating force to the valve member to assist in closing one or the other of the outlet flow passages. However, in the event that the valve is closed against such high line pressure, reopening of the valve from one or the other of the outlet flow passages has posed a problem where the high line pressure creates a force tending to hold the valve member against the valve seates of the outlet flow passages.

Non balanced, three-way, two-position diverter valves were initially used in well test manifolds because it was believed that a well test application would rarely, if ever, have a need for closing against differential pressure across the valve member and because the intent of the diverter valve was to direct the production flow stream from one path to an alternate path, both of which would be operating at the same system pressure. However, this premise did not hold true because many well test manifolds were utilized to test wells flowing into two or more levels of multiple pressure in the group system. Accordingly, it became necessary to effect closure of a valve member at high differential pressures through a diverter valve. The need for a substantially balanced three-way, two-position diverter valve was thus apparent.

While the prior art is aware of balanced two-way shut-off valves, such as taught in U.S. Pat. No. 3,331,583, in the name of William J. Baker, attempts to develop a substantially balanced three-way, two-position diverter valve which is certain in its operation and which is easy to assemble, repair and maintain, have been unsuccessful.

SUMMARY OF THE INVENTION

The present invention provides a substantially balanced three-way, two-position diverter valve for high pressure application, as for example, in oil or gas production, which permits high differential pressure across the valve seat of each outlet flow passage with only a small actuator stem force required to hold the valve member in sealing contact with the valve seats.

This balance is achieved by providing a balance rod attached to the valve member with a cross sectional area nearly equal to that of the valve seats so that the valve member and the balance rod create opposing forces. The actuator stem of the actuator means for moving the valve member is left unbalanced so as to create the need for an increasing force to stroke the valve member with increasing fluid pressure in the valve body. This also provides a force in addition to the spring in the actuator means to assist the actuator means in the upward direction to effect a "fail safe" position with loss of power.

Briefly, the substantially balanced three-way, two-position diverter valve is a function of (1) the combination of dimensional control of the bore of the valve seats and their respective radius as they make contact with the resilient seals on the valve plug, (2) the balance piston passage or bore, and (3) the actuator stem area. The selection of a seal material, which is of a yieldable polymeric material, is also important so as to provide a good balance between the extermes of resilience and stiffness.

BRIEF DESCRIPTION OF THE DRAWINGS

FIG. 1 is a longitudinal sectional view through a substantially balanced three-way, two-position diverter valve made in accordance with the invention, the valve member being shown in its first position.

FIG. 2 is a view corresponding to FIG. 1, the valve member being shown in its second position.

FIG. 3 is a transverse sectional view as taken on the line 3—3 of FIG. 1.

FIG. 4 is an enlarged fragmentary view showing the valve member.

FIG. 5 is a graphical summary of the results of a testing program on a substantially balanced three-way, two-position diverter valve according to the present invention.

DESCRIPTION OF THE PREFERRED EMBODIMENTS

The substantially balanced three-way, two-position diverter valve 10 of the present invention is particularly suited to oil field purposes, such as, for example, use in well test manifolds where periodic testing or diverting of a particular fluid stream from the normal production flow to a separate vessel is desired. However, it will be understood that while the diverter valve 10 of the present invention is especially suited to oil field purposes, it also lends itself to systems in other industries.

Referring to the drawings and to FIGS. 1 and 2 in particular, the diverter valve 10 of the present invention is shown 12 as set up for a typical well test manifold arrangement. As is well known, normally in oil field production, oil streams will be going into the common production line except for a particular well being tested, which will have its flow diverted into a smaller test chamber and then to a test vessel. As can be seen from the test manifold arrangement of FIGS. 1 and 2, the flow stream 14 enters into an inlet chamber 16. From the inlet chamber 16 it is diverted into the group or high volume production chamber 18 or into the test or alternative production chamber 20. This is accomplished by any suitable valve, but preferably by way of a three-way, two-position diverter valve, such as the valve 10 of the present invention, by raising or lowering a valve member or plug 66 inside the valve chamber 38.

Typically so-called standard two-way ball valves 24 are shown as set up for the well test manifold or arrangement positioned in the lines 26 and 28 leading to the group or high volume production facilities or to the test or alternative production facilities, respectively. In practice, the ball valves 24 are infrequently used, since their use is primarily for emergency and in service requirements.

It is common practice in the valve and actuator art to illustrate a valve or actuator assembly having its control at the top. Accordingly, hereinafter all movements of parts are referred to as up and down.

The three-way, two-position diverter valve 10 of the present invention is seen to comprise a valve body 30, preferably made up of body blocks 30a, 30b, and 30c, which may be rotated in 90° positions while being assembled to fit almost any piping configuration which a user of the valve 10 may have. As can be seen, the inlet block 30a is provided with an inlet flow passage 32 and the outlet blocks 30b and 30c are provided with outlet flow passages 34 and 36, respectively, with the outlet flow passage 34 leading to the group or high volume production chamber 18 and the outlet flow passage 36 leading to the test or alternative production chamber 20. A valve chamber 38 communicates with the inlet passage 32 and with each of the outlet flow passages 34 and 36.

In practice, it has been found that preferably inlet and outlet connections to the valve 10 are made through face sealed flange connections 40 which have a metal-to-metal primary seal 42 and a secondary O-ring seal 44. However, it will, of course, be understood that a variety of end fittings may be utilized to meet the piping requirements of any installation. Further, flexibility is provided in that the test outlet, such as the outlet flow passage 36, may be rotated to any 90° position relative to the inlet connection for the inlet flow passage 32. Additionally, for maximum compactness in complete well test manifold design, the diverter valve 10 of the present invention may be assembled with desired ball valves, such as the valves 24 and check valves (not shown) in a building block construction which may be tailored to all installation requirements.

The valve chamber 38 of the inlet valve block 30a is provided with an annular recess 46 and 48 circumscribing each of the outlet flow passages 34 and 36, respectively. Annular retainer members 50 and 52 secure the annular valve seat rings 54 and 56 in the recesses 46 and 48 of the outlet flow passages 34 and 36, respectively. In practice, the metal vlave seat rings 54 and 56 have inner diameter edges 54a and 56a thereof, respectively, being curved or radiused to provide, as will be more fully explained hereinafter, line contact with the annular yieldable polymeric seals 58 and 60 of the valve plug 62.

The retaining members 50 and 52 and the seat rings 54 and 56 are properly sealed against the wall of the valve chamber 38, as by annular grooves 51 within which an "O" ring 53 is mounted for sealing.

A valve member 66 is shiftably supported in the valve chamber 38 for movement between a first position in sealing engagement with the valve seat ring 54, wherein flow is directed from the inlet flow passage 32 through the outlet flow passage 34 leading to the group or high volume production line 26, and a second position in sealing engagement with the valve seat ring 56, wherein flow is directed from the inlet flow passage 32 through the outlet flow passage 36 leading to the test or alternative product line 28. The valve member 66 is provided with a passage 68 extending therethrough. One end 64a of the balance rod 64, which is mounted for reciprocal movement in a valve housing 70 in the valve body 30, is secured to the valve member 66. A central, longitudinal passage 72 extending through the balance rod and terminating in at least one transverse passage 74 communicates with the passage 68 in the valve member 66 and with the pressure chamber area 76 above the balance rod, and alternately connects this area with the inlet flow passage 32, when the valve member 66 is in sealing engagement with the seat ring 54, and with the outlet passage 36, when the valve member 66 is in sealing engagement with the seat ring 56.

The end 64a of the balance rod 64 is preferably threadedly secured to the valve member 66 with an O ring 65 providing sealing engagement between the mating end walls. Mating annular recesses 78 and 80 in the balance rod 64 and valve members 66, respectively, form an annular recess which receives the annular inner valve plug 62, which is sealed against the end walls of the balance rod 64 and the valve member 66 by the annular seals 58 and 60. The annular seals 58 and 60 are preferably of rectangular cross section and the corners thereof have been cut-off on 45° to provide line contact with the valve seat rings 54 and 56. The diameter of each of the valve seats formed by the radius edges of the seat rings 54 and 56 is slightly less than the outside diameter of the end 64b of the balance rod 64.

The selection of the material of the seals 58 and 60 is of particular importance because a material which is too soft, such as rubber or Teflon, will deform and create a shifting of the seal area on the valve seat rings 54 and 56. Likewise, material that is too rigid, will not deform sufficiently to effect a zero-leak seal at low seating loads. It has been found that the preferable material for the seals 58 and 60 for most oil field applications is of yieldable polymeric material, such as High Density Polyethylene which has a good balance between the extremes of resilience and stiffness in oil well applications. However, while the seals 58 and 60, in the preferred form of the invention, are constructed from a yieldable polymeric material or relatively hard and resilient synthetic resin, it will be understood that other elastomers, such as natural or synthetic rubber, may also be used satisfactorily. The specific composition, hardness and resiliency of the material used to construct the seals 58 and 60 depends upon the intended service in which the valve 10 of the present invention is to be utilized. Accordingly, it is contemplated that the designer will select for use in constructing the seals 58 and 60 a yieldable polymeric material of suitable physical qualities, the designer taking into account in the selection of a particular seal material the chemical characteristics of a fluid to which the valve will be exposed, temperature and pressure conditions under which the valve will operate in service and other pertinent considerations routinely considered by valve designers in the selection of particular structural materials for particular valves.

Actuator means are provided for effecting reciprocation of the valve member 66 between the edges 54a and 56a of the seat rings 54 and 56, respectively. Such actuator means may be of the well known piston or electric type. However, for purposes of explanation only, a piston actuator will be described in connection with the operation of the diverter valve 10 of the present invention.

Briefly, and as shown, the actuator means includes an actuator cylinder 82 on the valve body. An elongated actuator stem 84 having a piston 86 is mounted in the cylinder 82. A pressure fluid inlet 88 is provided in the cylinder on one side of the piston 86. The end 64b of the balance rod 64 is secured to the end 84a of the actuator stem 84 by means of the collar 90, which threadedly receives the stem 84 and which in turn is threadedly received in the end of the port 72 of the connecting rod 64. The pressure chamber area 76 is provided at the end 64b of the balance rod 64 by the O ring seals 92 and 94 which seal the wall of the valve housing 70 against the valve bonnet 96 and the balance rod 64, respectively. Suitable packing 98 well known in the art is provided within the valve bonnet 96 surrounding the actuator stem 84.

The cylinder actuator 82 is suitable for air, instrument gas or hydraulic operation, as desired. A spring 100 surrounding the stem 84, with one end contiguous with the piston 86 and the other end contiguous with a spring retainer 102, provides a piston return to divert inlet flow 14 to the outlet 34 leading to the group line 26 on loss of cylinder pressure. An indicator rod 104 provides visual indication to the user with respect to the movement of the piston 86, and thus the valve member 66.

As previously indicated, the substantially balanced diverter valve 10 of the present invention will permit differential pressure of any value (up to the maximum pressure rating of the valve body) to be applied across either valve seat 54 or 56, and at any inlet or outlet passage, with only a small actuator stem force required to hold the valve member 66 in sealing contact with the valve seats 54 and 56. The means for accomplishing this balance is achieved by providing the balance rod 64 connected at one end 64a thereof to the valve member 66 with a cross sectional area at the other end 64b thereof nearly equal to that of the valve seats 54 and 56 so that the valve member 66 and the balance piston 64 create opposing forces. It will, of course, be understood that whatever fluid pressure exists in the valve chamber 38 will find access through the passage 68, in the valve member 66, and the passages 72 and 74 in the balance rod 64, into the pressure chamber 76, so that the end of the balance rod 64 is effectively subjected to the same fluid pressure as is subjected against the valve member 66, as a result of which the valve member 66 and the balance rod 64 create opposing forces. Accordingly, no matter what may be the magnitude of that fluid pressure, it neither has an effect tending to move the valve member 66 from its first position to its second position, nor an effect tending to move the valve member 66 from its second position to its first position. Therefore, operation of the valve member 66 is a function of the force applied to the piston 86 by the spring 100 and the force applied to the piston 86 by the fluid pressure through the inlet 88 in opposition to the spring 100.

The acutator stem 84 which attaches to the piston 86 is intentionally left unbalanced so as to create the need for an increasing force to stroke the valve member 66 with increasing fluid pressure in the valve chamber 38. This also provides a force in addition to the spring 100 in the actuator means to assist the actuator means in the upward direction to effect a "fail-safe" position with loss of power.

In light of the foregoing, it will be understood that the balance of the three-way, two-position diverter valve 10 of the present invention is a function of the combination of dimensional control of (1) the bore of the valve seats 54 and 56 and their respective radius as they make contact with the resilient seals 58 and 60 on the valve plug 62, (2) the balance piston passage or bore 72, and (3) the cross sectional area of the actuator stem 84. It will be seen from FIGS. 1 and 2 that the special design requirements to achieve a substantially balanced three-way, two-position diverter valve 10 in all four instances of pressure differential on the seating areas are as follows:

A. Assume valve seat 54 closed, as in FIG. 1. Pressure higher at inlet flow passage 32 than at test outlet flow passage 36.

B. Assume valve seat 54 closed, as in FIG. 1. Pressure higher at test outlet flow passage 36 than at inlet flow passage 32.

C. Assume valve seat 56 closed, as in FIG. 2. Pressure higher at inlet flow passage 32 than at group outlet flow passage 34.

D. Assume valve seat 56 closed, as in FIG. 2. Pressure higher at group outlet flow passage 34 than at inlet flow passage 32.

In case "A" above, a near-balance is achieved by the passage 72 in the balance rod 64, between the passage 68 in the valve member 66 and the end 64b of the balance rod 64, such that the fluid pressure on the bottom of the valve member 66 is opposed by the fluid pressure on the end area of the balance rod 64 in the pressure chamber 76. Complete 100 percent balance is intentionally avoided to enable the valve member 66 to remain seated as the body pressure increases. The seat contact diameter is intentionally slightly less than the diameter of the end 64b of its balance rod 64; however, the net area exposed to high pressure is still greater than the balance rod area minus the stem area on the opposite end 64b, thus effecting a tighter seal as the fluid pressure increases.

In case "B" the amaller seal area of the end of the valve member 66 as compared to the balance rod 64 also results in an increasing seating load as the fluid pressure increases. Similar analysis can be used in cases "C" and "D" so as to always bias the valve member 66 in the same direction as the actuator means to effect an upward movement of the valve member 66 in the evnet of power failure.

FIG. 5 is a graphical showing of actual test results using the letters A, B, C, D, as indicated above. For comparison, a plot of an unbalanced ¾ inch stem is also provided to illustrate the fact that the valve member 66 is almost fully balanced; the total stem force required to shift the valve member 66 being lower than that required to theoretically shift the stem only.

In the practical application of the valve 10 of the present invention to direct inlet flow through one of two outlets, as for example, to direct high pressure well production into group or test facilities, the valve body 30 will be installed in a well test manifold 12 and a source of pressure fluid will be connected to the inlet 88 so as to pressurize the cylinder 82, as seen in FIG. 2, the pressure fluid being employed to overcome the spring 100 so that the valve member 66 will move from its first position in sealing contact with the valve seat 54, to its second position in sealing contact with the valve seat 56. The valve member 66 amy be moved from its second position to its first position at will be venting the source of pressure control fluid or may be automatically closed by use of suitable automatic control instrumentalies (not shown) well known in the art whereby to automatically vent the cylinder 82 above the piston 86 when testing of a particular well ceases or upon some predetermined variation in the flow or pressure of fluid passing through the valve body 30.

In any event, when the cylinder 82 is vented to atmosphere, or when the pressure in the cylinder 82 is reduced so that the downward force applied to the piston 86 is less than the force of the spring 100 acting upwardly on the piston 82, the valve member 66 will be moved from its second position in FIG. 2, wherein it is seated against the valve seat 56, to its first position shown in FIG. 1, wherein it is seated against the valve seat 54. No matter what may be the pressure of fluid at the inlet passage 32 or at the outlet passages 34 or 36, the valve member 66 may be easily moved from its second position to its first position by the small force of the spring 100 augmented by the small design unbalanced load, and from its first position to its second position by the application of sufficient pressure to the cylinder 82 to overcome the upward spring force of the spring 100 and the small design unbalanced load.

From the foregoing, it will now be apparent that the present invention provides an easily operable substantially balanced, three-way, two-position, diverter valve which is substantially insensitive to flow line pressures and which therefore is easily operated by small operating forces. Additionally, the structure of the valve is such that the valve is easy to assemble, repair and maintain. For example, the seat rings 54 and 56 are reversible to permit turn-over in the field if erosion develops on one side thereof. The valve 10 of the present invention is provided with unrestricted flow passages to reduce pressure loss and to minimize the effects of erosion and sand cutting. The long valve stroke places the valve member 66 completely out of the flow stream in both seated positions. This protects the seals 58 and 60 to insure long life and reliable sealing performance. Finally, the fact that the period of time a user of a diverter valve 10 will have the valve in the "Test" position (valve member is in its second position) is normally much less than in the "Group" position (valve member 66 is in its first position) is used to an advantage for improved erosion resistance, since the flow to "Group" is always unrestricted, while the flow to "Test" passes through the valve seat 54 with the balance rod 64.

It will, of course, be understood that many possible embodiments may be made of the invention without departing from the scope thereof. For example, while the means communicating with the passage 68 in the valve member 66 and with the area above the end 64b of the balance rod 64 in the pressure chamber 76 has been disclosed as a central, longitudinal passage 72 extending through the balance rod 64, with one end of the passage 72 communicating with the passage 68 in the valve member 66 and the other end thereof terminating in at least one transverse passage 74 communicating with the area above the end 64b of the balance rod 64 in the pressure chamber 76, such means may also comprise an exemplary external passage or tubing 104 (shown in dashed lines in FIGS. 1 and 2) joining the valve chamber 38 and the pressure chamber area 76 so as to serve the same purpose as the internal passage 72. Accordingly, all matter herein set forth or shown in the accompanying drawings is to be interpreted as illustrative and not in a limiting sense.

The embodiments of the invention in which an exclusive property or privilege is claimed are defined as follows:

1. In a three-way, two-position diverter valve for high pressure application used to direct inlet fluid flow through one of two outlets, as desired, of the type having a valve body comprising an inlet flow passage, first and second outlet flow passages and a valve chamber communicating with said inlet passage and each of said outlet flow passages, a valve seat circumscribing each of said outlet flow passages, a valve member shiftably supported in said valve body for movement between a first position in sealing engagement with one of said valve seats, wherein flow is directed from said inlet flow passage through said first outlet flow passage, and a second position in sealing engagement with the other of said valve seats, wherein flow is directed from said inlet flow passage through said second outlet flow passage, and actuator means associated with said valve member for moving said valve member between said first and second positions, said actuator means including an actuator stem and means for applying force tending to move said actuator stem in one direction, or downwardly, the improvement, in combination therewith, comprising a passage extending through said valve member, an annular valve plug encircling said valve member, said vlave plug being sealingly secured to said valve member by annular seals of rectangular cross-section the corners of which have been cut-off on 45° to provide line contact with said valve seats, said vlave seats comprising an annular seat ring with the edges of the inside diameter thereof being radiused to provide line contact with said corners of said annular seals sealing said valve plug to said valve member, a balance rod connected to said valve member and having a free end projecting from said valve member, the free end of said balance rod being secured to said actuator means, means providing a pressure chamber at said free end of said balance rod, means communicating with said passage in said valve member and with the area above said balance rod in said pressure chamber alternately connecting said pressure chamber with said inlet flow passage, when said valve member is in said first position, and with said first outlet flow passage, when said valve is in said second position, the area of the free end of said balance rod being slightly less than the area of each said valve seat, so that said valve member and said balance rod create opposing forces, with said actuator stem for moving said valve member being intentionally unbalanced, so as to create a need for an increasing force to stroke said valve member with increasing fluid pressure in said valve chamber and to provide a force to assist said actuator means in the upward direction, whereby an engineered unbalance of said actuator stem is used in a manner that stabilizes the effects of normal variations in seating contact area.

2. The diverter valve according to claim 1, wherein said means communicating with said passage in said valve member and with said pressure chamber comprises a central, longitudinal passage extending through said balance rod, one end of said passage communicating with said passage in said valve member and the other end thereof communicating with the area above said balance rod in said pressure chamber.

3. The diverter valve according to claim 2, wherein the other end of said longitudinal passage terminates in at least one transverse passage communicating with the area above said balance rod in said pressure chamber.

4. The diverter valve according to claim 1, wherein said annular seals are formed of a yieldable polymeric material.

5. The diverter valve according to claim 1, wherein the diameter of each of said valve seats is slightly less than the diameter of the free end of said balance rod.

6. In a three-way, two-position, cylinder operated, diverter valve for high pressure application used to direct inlet flow through one of two outlets, as desired, of the type having a valve body comprising an inlet flow passage, first and second outlet flow passages and a valve chamber communicating with said inlet passage and each of said outlet flow passages, a valve seat circumscribing each of said outlet flow passages, a valve member shiftably supported in said valve body for movement between a first position in sealing engagement with one of said valve seats, wherein flow is directed from said inlet flow passage through said first outlet flow passage, and a second position in sealing engagement with the other of said valve seats, wherein flow is directed from said inlet flow passage through said second flow passage, and actuator means associated with said valve member for moving said valve member between said first and second positions, said actuator means including an actuator stem, a pistion on said stem, an actuating cylinder in which said piston is reciprocal to move said valve member between said first and second positions, an actuator fluid inlet in said cylinder at one side of said piston, and means for applying force tending to move said actuator stem in one direction, or downward, upon the admission of actuator fluid into said cylinder, the improvement, in combination therewith comprising a passage extending through said valve member, an annular valve plug encircling said valve member, said valve plug being sealingly secured to said valve member by annular seals of rectangular cross-section the corners of which have been cut-off on 45° to provide line contact with said valve seats, said valve seats comprising an annular seat ring with the edges of the inside diameter thereof being radiused to provide line contact with said corners of said annular seals sealing said valve plug to said valve member, a balance rod connected to said valve member and having a free end projecting from said valve member, said balance rod being mounted for reciprocal movement in a valve housing in said valve body, the free end of said balance rod being secured to said actuator stem, means providing a pressure chamber at said free end of said balance rod, and means communicating with said passage in said vlave member and with the area above said balance rod in said pressure chamber alternately connecting said pressure chamber with said inlet flow passage, when said valve member is in said first position, and with said first outlet flow passage, when said valve member is in said second position, the area of the free end of said balance rod being slightly less than the area of each said valve seat, so that said valve member and said balance rod create opposing forces, with said actuator stem for moving said valve member being intentionally unbalanced, so as to create the need for an increasing force to stroke said valve member with increasing fluid pressure in said valve chamber and to provide a force to assist said actuator means in the upward direction, whereby an engineered unbalance of said actuator stem is used in a manner that stabilizes the effects of normal variations in seating contact area.

7. The diverter valve according to claim 6, wherein said means communicating with said passage in said valve member and with said pressure chamber comprises a central, longitudinal passage extending through said balance rod one end of said passage communicating with said passage in said valve member and the other end thereof communicating with the area above said balance rod in said pressure chamber.

8. The diverter valve according to claim 7, wherein the other end of said longitudinal passage terminates in at least one transverse passage communicating with the area above said balance rod in said pressure chamber.

9. The diverter valve according to claim 6, wherein said annular seals are formed of a yieldable polymeric material.

10. The diverter valve according to claim 6, wherein the diameter of each said valve seat is slightly less than the diameter of the free end of said balance rod.

11. In a three-way, two position, cylinder operated, diverter valve for high pressure application used to direct inlet fluid flow through one of two outlets as desired, of the type having a valve body comprising an inlet flow passage, first and second outlet flow passages and a valve chamber communicating with said inlet passage and each of said outlet flow passages, a valve seat circumscribing each of said outlet flow passages, a valve member shiftably supported in said valve body for movement between a first position in sealing engagement with one of said vlave seats, wherein flow is directed from said inlet flow passage through said first outlet flow passage, and a second position in sealing engagement with the other of said valve seats, wherein flow is directed from said inlet flow passage through said second outlet flow passage, and actuator means associated with said valve member for moving said valve member between said first and second positions, said actuator means including an actuator cylinder on said body, an actuator stem having a piston in said cylinder, said cylinder having at one side of said piston a pressure fluid inlet, and means for forcing said piston and said stem opposite to the force supplied to said piston upon admission of pressure fluid through said inlet passage, or upwardly, the improvement in combination therewith, comprising a passage extending through said valve member, an annular valve plug encircling said valve member, said valve plug being sealingly secured to said valve member by annular seals of rectangular cross-section the corners of which have been cut-off on 45° to provide line contact with said valve seats, said valve seats comprising an annular seat ring with the edges of the inside diameter thereof being radiused to provide line contact with said corners of said annular seals sealing said valve plug to said valve member, a balance rod connected to said valve member and having a free end projecting from said valve member, said balance rod being mounted for reciprocal movement in a valve housing in said valve body, the free end of said balance rod being secured to said actuator stem, means providing a pressure chamber at said free end of said balance rod, and means communicating with said passage in said valve member and with the area above said balance rod in said pressure chamber alternately connecting said pressure chamber with said inlet flow passage, when said valve member is in said first position, and with said first outlet flow passage, when said valve member is in said second position, the area of the free end of said balance rod being slightly less than the area of each said valve seat so that said valve member and said balance rod create opposing forces, with said actuator stem for moving said valve member being intentionally unbalanced, so as to create the need for an increasing force to stroke said valve member with increasing fluid pressure in said valve chamber and to provide a force to assist said actuator means in the upward direction, whereby an engineered unbalance of said actuator stem is used in a manner that stabilizes the effects of normal variations in seating contact area.

12. The diverter valve according to claim 11, wherein said means communicating with said passage in said valve member and with said pressure chamber comprises a central, longitudinal passage extending through said balance rod, one end of said passage communicating with said passage in said valve member and the other end thereof communicating with the area above said balance rod in said pressure chamber.

13. The diverter valve according to claim 12, wherein the other end of said longitudinal passage terminates in at least one transverse passage communicating with the area above said balance rod in said pressure chamber.

14. The diverter valve according to claim 11, wherein said annular seals are formed of a yieldable polymeric material.

15. The diverter valve according to claim 11, wherein the diameter of each said valve seat is slightly less than the diameter of the free end of said balance rod.

* * * * *